United States Patent [19]

Melcher

[11] Patent Number: 4,958,080

[45] Date of Patent: Sep. 18, 1990

[54] LUTETIUM ORTHOSILICATE SINGLE CRYSTAL SCINTILLATOR DETECTOR

[75] Inventor: Charles L. Melcher, West Redding, Conn.

[73] Assignee: Schlumberger Technology Corporation, New York, N.Y.

[21] Appl. No.: 389,502

[22] Filed: Aug. 4, 1989

Related U.S. Application Data

[63] Continuation of Ser. No. 254,353, Oct. 6, 1988, abandoned.

[51] Int. Cl.$^5$ .......................... C09K 11/79; G01J 1/58
[52] U.S. Cl. ............................ 250/483.1; 250/361 R; 252/301.4 F
[58] Field of Search .............. 252/301.4 F; 250/483.1, 250/361 R

[56] References Cited

U.S. PATENT DOCUMENTS 4,208,611  6/1980  Watanabe et al. ............ 252/301.4 F
4,647,781  3/1987  Takagi et al. ................. 252/301.4 F

FOREIGN PATENT DOCUMENTS 51-59079  5/1976  Japan ............................. 252/301.4 F

OTHER PUBLICATIONS

"Serie Isomorphe d'Orthosilicates (T$_2$SiO$_5$) et d'Orthogermanates (T$_2$GeO$_5$) De Terres Rares", Buisson et al., Mat. Res. Bull. vol. 3, pp. 193–198, 1968.

"Preparation and Cathodoluminescence of Ce$^{3+}$-Activated Yttrium Silicates and Some Isostructural Compounds", A. H. Gomes de Mesquita et al., Mat. Res. Bull. vol. 4, pp. 643–650, 1969.

"Growth of Lanthanide Oxyorthosilicate Single Crystals, and Their Structural and Optical Characteristics", G. V. Anan'eva et al., Translated from Izvestiya Akademii Nauk SSSR, Neorganicheskie Materialy, vol. 17, No. 6, pp. 1037–1042, Jun. 1981.

"Site Selectively Excited Luminescence of Eu$^{3+}$ IN Gadolinium, Yttrium and Lutetium Oxyorthosilicates", Holsa et al., Journal of the Less–Common Metals, 126 (1986) 215–220.

"Cerium-Activated Gd$_2$SiO$_5$ Single Crystal Scintillator", Takagi et al., Appl. Phys. Lett., vol. 42, No. 1, 1 Jan. 1983, pp. 43–45.

"Czochralski Growth of Rare-Earth Orthosilicates (Ln$_2$SiO$_5$)", Brandle et al., Journal of Crystal Growth 79 (1986) pp. 308–315.

"Sol-Gel Deposition of Tb$^{3+}$:Y$_2$SiO$_5$ Cathodoluminescent Layers", Rabinovich et al., Am. Ceram. Soc. Bull. 66[10] 1505–09 (1987).

"Characteristic Luminescence", Blasse et al., Philips Technical Review, vol. 31, 1970, No. 10.

"Development of New Scintillation Crystal Gd$_2$SiO$_5$: Ce for Gamma-Ray Detection", Ishii et al., submitted to 4th Experts Meeting on Positron CT between AIST Japan and STU Sweden, Stockholm, Mar. 17–20, 1986.

*Primary Examiner*—Jack Cooper
*Attorney, Agent, or Firm*—Brumbaugh Graves Donohue & Raymond

[57] ABSTRACT

A scintillator for use as a gamma ray or like radiation detector is composed of a single crystal of cerium-activated lutetium oxyorthosilicate having the general formulation Ce$_{2x}$Lu$_{2(1-x)}$SiO$_5$. In a borehole logging application, the detector is mounted in a logging sonde with a high energy neutron source, for movement through a borehole traversing earth formations. Gamma radiation from the surrounding formations is detected and analyzed to provide information concerning hydrocarbons in the formations.

2 Claims, 2 Drawing Sheets

LUTETIUM ORTHOSILICATE SINGLE CRYSTAL SCINTILLATOR DETECTOR

BACKGROUND OF THE INVENTION

This application is a continuation, now abandoned of application Ser. No. 254,353, filed Oct. 6, 1988.

The present invention relates to a single crystal scintillation detector for gamma rays and like radiation and, more particularly, to a single crystal scintillation detector composed of lutetium orthosilicate.

A well-known form of detector for gamma rays and like radiation (such as x-rays, cosmic rays, and energetic particles of approximately 1 KeV and above) employs a transparent single crystal, known as a scintillator, which responds to impinging radiation to emit light pulses. The light pulses are optically coupled to the input of a photomultiplier tube, which generates a voltage signal related to the number and amplitude of the light pulses received. Scintillators of this class have found wide application in various fields, such as nuclear medicine, physics, chemistry, mineral and petroleum exploration, etc.

Perhaps the most widely used type of scintillator is thallium-doped sodium iodide, NaI (Tl). Relatively inexpensive to produce and capable of providing a high light output in response to impinging radiation, NaI detectors have found general use, for example, in logging tools for oil well logging operations, where either naturally occurring or induced gamma radiation is detected to aid in the location of petroleum deposits.

Other known single crystal scintillators used for gamma ray detection include cesium iodide (sodium or thallium activated) and bismuth germanate (BGO). Organic scintillators, such as naphthalene, anthracene, stilbene and similar materials, have also been employed, particularly where very high count rates are important, although they generally are not as useful as inorganic scintillators for the detection of gamma rays.

All of the foregoing types of scintillators have one or more disadvantages as gamma ray detectors. For example, NaI scintillators have comparatively low density, and thus low radiation detection efficiency, slow scintillation decay and a large and persistent afterglow, which impair counting rate performance and lead to pulse pile-up, and are hygroscopic. Although BGO scintillators do not suffer from the low density and hygroscopicity problems of NaI scintillators, they do have a relatively slow scintillation decay time and low light output, which drops still lower at higher temperatures. The index of refraction of BGO is also relatively high, resulting in light loss by internal reflection. These and other disadvantages of known scintillators have limited their usefulness as gamma ray detectors or have imposed restrictions on the manner of their use. In the harsh conditions (high temperature, high pressure, moisture, etc.) of oil well logging, for example, restrictions in logging speed, statistical reliability, tool size and the like have resulted directly from the scintillator material employed in a given logging tool. Accordingly, efforts have long continued to develop still more useful and reliable scintillation detectors and gamma ray scintillation detectors in particular.

More recently, a gamma ray detector employing a scintillator formed of a single crystal of cerium-activated gadolinium orthosilicate (GSO) has been proposed. The GSO scintillator has the advantages as a gamma ray detector of high effective atomic number, high density, fast scintillation decay, relatively low index of refraction, but has the disadvantages of low light output, a strong tendency to cleave which makes cutting and polishing difficult, and, more significantly, very high thermal neutron capture cross section (49,000 barns). This last characteristic strongly suggested that GSO scintillators would have very limited utility, if any, in those applications, such as many nuclear well logging tools for instance, where the gamma radiation to be detected is induced by neutron irradiation. This is because gadolinium, upon the capture of thermal neutrons, emits gamma radiation which would interfere with the detection of the external gamma rays of interest.

Such a GSO scintillator detector is described in U.S. Pat. No. 4,647,781, issued Mar. 3, 1987, for use in positron computed tomography. There is no disclosure in the '781 patent, however, of the suitability of the GSO scintillator as a gamma ray detector in the hostile conditions of borehole logging. Indeed, it was the present inventor and his co-workers who, through experimentation and evaluation, first discerned that the GSO scintillator was useful as a borehole detector. This invention is disclosed in the copending, commonly-owned U.S. application Ser. No. 149,953 filed Feb. 2, 1988 by Charles L. Melcher et al., which is a continuation of U.S. application Ser. No. 812,220 filed Dec. 23, 1985. U.S. application Ser. No. 149,953 issued as U.S. Pat. No. 4,883,956, granted Nov. 28, 1989

Success in adapting the GSO scintillator to borehole use led the inventor to consider other rare earth compounds as possible scintillators for gamma ray (and the like) detection. As a first step, various phosphor materials were studied in powder form for initial evaluation in order to identify potential candidates for crystal growth. This initial evaluation was done using procedures similar to those described by A. H. Gomes de Mesquita et al. at pages 643–650 of Materials Research Bulletin, Vol. 4, No. 9, 1969, Pergamon Press, Inc., who were investigating the properties of rare-earth phosphors as their primary goal. The term phosphor as used in the Gomes de Mesquita et al. paper and as used herein refers to the fine powdered form. Such phosphors are typically used as coatings on cathode ray tube screens, fluorescent light bulbs, and the like, where they convert impinging electrons or ultraviolet radiation into visible light pulses. They are, however, not suitable as gamma ray or like radiation detectors since energetic photons or particles have high probability of passing through the thin coating with no interaction. If the coating is made sufficiently thick to stop gamma rays, the resulting opacity of the phosphor layer would trap most of the scintillation signal. Consequently, only transparent single crystals are useful as gamma ray detectors.

Although some of the physical and optical properties of the rare earth phosphors were known, their scintillation properties were not known and could not be predicted in advance because of the complex and only partially understood nature of the scintillation mechanism. For example, on the basis of atomic number, ionic radius, electronic charge, density, refractive index, and absence of absorption bands, cerium-doped ytterbium orthosilicate powder and cerium-doped lutetium orthosilicate powder would be expected to have very similar scintillation properties. In fact, however, the phosphor experiments showed that ytterbium orthosilicate has 1000 times less scintillation output compared to lutetium orthosilicate.

Moreover, it was not at all clear whether the luminescence properties or other properties of the single crystal form of a rare earth compound would be the same as those of the phosphor form. Generally, in fact, the scintillation properties of single crystal scintillators are not readily determinable or predictable with certainty in advance from the phosphors.

SUMMARY

In accordance with the present invention, therefore, an improved scintillator for use as a gamma ray (or like radiation) detector is provided which comprises a single crystal of cerium-activated lutetium oxyorthosilicate having the general formulation $Ce_{2x}Lu_{2(1-x)}SiO_5$. Generally, the value of x (as measured in the initial melt from which the crystal is pulled) may be varied within the approximate range of from 0.001 to 0.1, with the preferred range of x being from approximately 0.005 to 0.015. When assembled in a complete detector, the scintillator crystal is optically coupled, either directly or through a suitable light path, to the photosensitive surface of a photodetector for generation of an electrical signal in response to the emission of a light pulse by the scintillator. The LSO scintillator of the invention possesses certain important characteristics, most notably high light output, very short decay time and high detection efficiency, that make it superior to prior scintillators as a gamma ray or like radiation detector, particularly in the borehole logging environment.

DESCRIPTION OF REPRESENTATIVE EMBODIMENT

For illustrative purposes, a representative embodiment of the invention is described hereinafter in the context of a gamma ray detector. It will be understood, of course, that the utility of the novel LSO single crystal scintillator of the invention is not limited to the detection of gamma radiation but that it has general application to the detection of other types of like radiation, e.g. X-rays, cosmic rays, and energetic particles.

Figure 1:
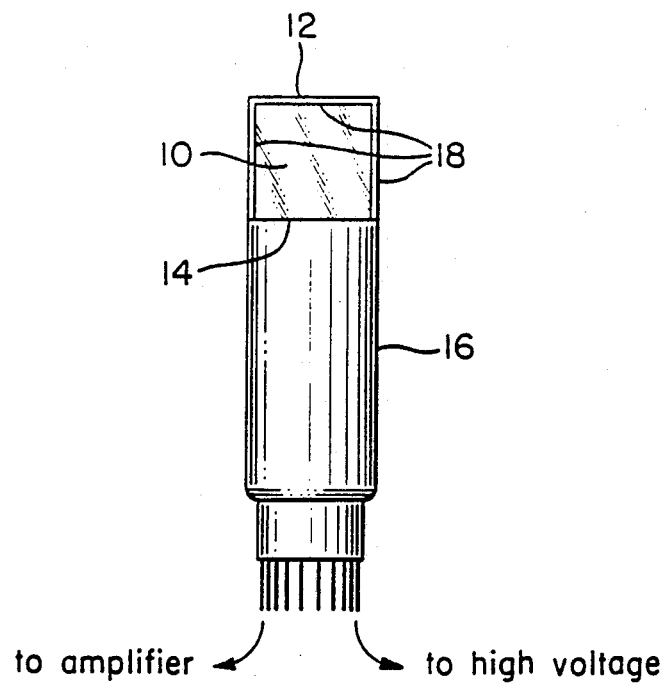
FIG. 1 is a diagrammatic view of one embodiment of an LSO scintillation detector in accordance with the present invention.

In FIG. 1, a single crystal LSO scintillator 10 is shown encased within the housing 12 of a gamma ray detector. One face 14 of the scintillator is placed in optical contact with the photosensitive surface of a photomultiplier tube 16. Alternatively, the light pulses could be coupled to the photomultiplier via light guides or fibers, lenses, mirrors, or the like. The photomultiplier can be replaced by any suitable photodetector such as a photodiode, microchannel plate, etc. In order to direct as much of each light flash to the photomultiplier as possible, the other faces 18 of the scintillator are preferably surrounded or covered with a reflective material, e.g. Teflon tape, magnesium oxide powder, aluminum foil, or titanium dioxide paint. Light pulses emitted by the LSO crystal upon the incidence of radiation are intercepted, either directly or upon reflection from the surfaces 18, by the photomultiplier, which generates electrical pulses or signals in response to the light pulses. These electrical output pulses are typically first amplified and then subsequently processed as desired, e.g. in a pulse height amplifier, to obtain the parameters of interest regarding the detected radiation. The photomultiplier is also connected to a high voltage power supply, as indicated in FIG. 1. Other than the LSO scintillator, all of the components and materials referred to in connection with FIG. 1 are conventional, and thus need not be described in detail.

As the first step in the evaluation of cerium-activated lutetium oxyorthosilicate $Ce:Lu_2SiO_5$ as a scintillator, the material was synthesized in phosphor (powder) form and the scintillation properties of the resulting compound were analyzed. From this analysis, it was determined that LSO was sufficiently promising as a scintillator material to warrant the additional effort and expense of growing in single crystal form. LSO was chosen as a candidate for phosphor synthesis because of its high atomic number and high density and the absence of optical absorption bands in the visible part of the spectrum. The principal physical and optical properties of LSO are compared to those of GSO and NaI (Tl) in Table 1, from which it may be seen that LSO appears to offer advantages over GSO in all properties and over NaI (Tl) in the areas of atomic number, density, index of refraction and hygroscopicity.

TABLE 1

|  | NaI(Tl) | GSO | LSO |
|---|---|---|---|
| Effective atomic number | 51 | 59 | 66 |
| Density (gm/cm$^3$) | 3.67 | 6.71 | 7.4 |
| Index of Refraction | 1.85 | 1.91 | 1.82 |
| Neutron cross section (barns) | 6.2 | 49,000 | 84 |
| Hygroscopic? | yes | no | no |

As Ce-activated single crystals of LSO had not previously been grown, the scintillation properties of single-crystal LSO were unknown. Also unknown, therefore, was whether the properties of the LSO phosphor would be retained when the same material was grown into a single crystal.

The phosphor synthesis procedure consisted of the following steps:

(1) Fine powders of $Ln_2O_3$ (Ln=Gd, Lu) $SiO_2$ and either $CeO_2$ or $Ce_2O_3$ in the appropriate atomic ratios were mechanically mixed and loaded into an alumina boat. In each case the molar concentration of Ce was 0.5% relative to Gd or Lu.

(2) Each of the four compositions was sintered at 1500° C. for four hours in a tube oven in one of three atmospheres: neutral (pure argon), reducing (argon +2% hydrogen), or oxidizing (air). When a reducing atmosphere was used, a high purity alumina furnace tube was employed because the standard mullite tube was found to react with hydrogen at high temperature and contaminate the samples. The resulting material was solid and was ground into a powder for analysis.

(3) The fluorescence emission of the powder was excited with ultraviolet light and the emission and excitation spectra were recorded with a Spex Fluorolog (Model 212) spectrofluorometer. For emission measurements above room temperature, the sample chamber was continuously flushed with argon to suppress spurious fluorescence emission which occurred when the sample was heated above 100° C. in air.

Table 2 shows the intensity of the fluorescence emission measured at room temperature.

TABLE 2

| | GSO:CeO$_2$ | GSO:Ce$_2$O$_3$ | LSO:CeO$_2$ | LSO:Ce$_2$O$_3$ |
|---|---|---|---|---|
| Argon + H$_2$ | 44 | 17 | 71 | 27 |
| air | 1.8 | 1.6 | 11 | 28 |
| Argon | 12 | 8.5 | 100 | 86 |

(4) The fluorescence decay times of the phosphors were measured by spreading a thin layer of the phosphor on the face of a fast photomuliplier (Amperex 2020Q) and exciting the emission with an $^{241}$Am gamma-ray source. The pulse shape was observed at the anode of the photomultiplier with a fast oscilloscope and the decay time estimated from the oscilloscope trace.

Although the synthesis conditions employed were not necessarily optimum for each phosphor, inasmuch as the emission intensity of LSO was greater than that of GSO under all six synthesis conditions (three different atmospheres and two forms of cerium), it may be concluded that LSO's scintillation efficiency is intrinsically greater. The scintillation mechanism in cerium-activated phosphors is generally assumed to involve electronic transitions ($5d$ to $4f$) within the Ce$^{+3}$ ion. For this reason, it was expected that the most efficient phosphors would result from using Ce$_2$O$_3$ (i.e., Ce$^{+3}$) as a starting material and performing the synthesis in a slightly reducing atmosphere (Ar+H$_2$) in order to maintain the cerium in the +3 charge state. Surprisingly, as Table 2 shows, in every case except LSO prepared in air the best phosphors were those in which Ce was added as CeO$_2$. Also note that although the best GSO phosphors were those prepared in a reducing atmosphere, the best LSO phosphors were those prepared in a neutral atmosphere. Synthesis in air resulted in phosphors with lower light output and, more importantly, with emission spectra that differed from the single crystal emission spectrum.

Table 3 summarizes the scintillation properties of GSO and LSO phosphors, synthesized in the foregoing manner:

TABLE 3

| | GSO:CeO$_2$ | LSO:CeO$_2$ |
|---|---|---|
| Light output | 1 | 1.5–10 |
| Decay time | 60 ns | 50 ns |
| Emission peak | 430 nm | 415 nm |
| Temperature response | −0.4%/°C. | −1.3%/°C. |

A comparison of the physical properties (Table 2) and the scintillation properties (Table 3) of GSO and LSO show LSO to be superior to GSO in most areas. The light output of LSO is a factor of 1.5 to 10 greater than GSO depending on the synthesis conditions. This is a particularly notable advantage over GSO. A comparison of the emission spectra of the GSO:CeO$_2$ and LSO:CeO$_2$ phosphors synthesized in argon (with the excitation light wavelength corresponding to the strongest excitation band for each phosphor, 345 nm for GSO and 355 nm for LSO) shows the LSO emission to have a different shape and to be shifted somewhat towards the shorter wavelengths than the GSO emission. This apparent shift of the LSO spectrum, if exhibited in the single crystal form, would be advantageous since it would result in an emission that better matches the spectral response of high temperature photomultipliers.

The scintillation decay time of LSO of about 50 ns compares favorably with GSO's 60 ns. The effective atomic number of LSO is 66 compared to 59 for GSO and the density of LSO is 7.4 gm/cc compared to 6.7 gm/cc for GSO, both of which contribute to a higher radiation detection efficiency for LSO. The index of refraction of LSO is 1.82 compared to 1.91 for GSO, which results in less trapping of scintillation light. LSO is very much less sensitive to neutrons, since the thermal cross section for Lu is 77 barns compared to 49,000 barns for Gd.

The temperature response of LSO is somewhat worse than GSO. At 150° C., GSO's light output decreases to about 60% of its room temperature value, while LSO's light output decreases to about 20% of its room temperature value at 150° C. On the other hand, the emission spectrum of LSO was found to shift somewhat to shorter wavelengths than the GSO emission as temperature increased from room temperature up to 175° C. (the highest temperature measured). Again this would be advantageous in the single crystal form in terms of matching photomultiplier response.

Lutetium has a radioactive isotope ($^{176}$Lu) that produces a background noise level in the crystal. This could be eliminated by growing the crystal from pure $^{175}$Lu, or it could be handled by conventional background subtraction techniques.

The excitation spectrum of LSO exhibits three bands (262 nm, 298 nm, and 355 nm) and is similar to the GSO excitation spectrum except that the bands are shifted to somewhat longer wavelengths.

Although the comparison of the LSO and GSO phosphors showed LSO to be a promising scintillator for use in a gamma ray detector, the properties of the single crystal form cannot be predicted with certainty. Light output, one of the most important properties of a single crystal scintillator, is especially difficult to predict from the phosphor form. In order to continue with a more detailed evaluation of the material as well as to test a practical detector, therefore, it was necessary to grow a single crystal form of LSO. This was done from melts by the conventional Czochralski method, as described, for example, by C. D. Brandle et al., "Czochralski Growth of Rare-Earth Orthosilicates (Ln$_2$SiO$_5$)", *Journal of Crystal Growth*, No. 79, pp. 308–315, 1986.

Table 4 summarizes the scintillation properties of the LSO single crystals grown, as selected and cut to minimize imperfections. The composition of the melts was Ce$_{2x}$Lu$_{2(1-x)}$SiO$_5$, where x is the decimal value of the percentage set out in Table 4 under the heading "Ce nom". Cerium concentration in the crystals was on the order of 20%–30% of that in the melt.

TABLE 4

| | size (mm) | color | defects | Ce nom. (%) | light output (arbitrary unit) | energy res % | decay constant (ns) | emission max (UV excitation (nm) | emission max (gamma excitation (nm) |
|---|---|---|---|---|---|---|---|---|---|
| 1 | 5 × 6 × 1 | none | none | 1.0 | 156 | 8.8 | 44 | 395 | 428 |
| 2 | 7 × 9 × 1 | none | few | 1.3 | 109 | 12 | 41 | 395 | 430 |
| 3 | 5 × 5 × 25 | none | none | 0.7 | 146 | 11.2 | 44 | 394 | 428 |

TABLE 4-continued

| size (mm) | color | defects | Ce nom. (%) | light output (arbitrary unit) | energy res % | decay constant (ns) | emission max (UV excitation (nm) | emission max (gamma excitation (nm) |
|---|---|---|---|---|---|---|---|---|
| 4  5 × 5 × 1 | none | few | 0.6 | 104 | 13 | 38 | 393 | 426 |

Crystals 1, 2 and 4 were cut to the sizes listed from larger single crystals (5 mm×6 mm×28 mm, 7 mm×9 mm ×27 mm and 8 mm×8 mm×33 mm, respectively), but crystal 3 was the original size. All were clear of color and of high transparency, but crystals 2 and 4 had some defects. The light output was measured by coupling each crystal with optical coupling grease directly to a Hamamatsu R878 photomultiplier, with all surfaces except that coupled to the photomultiplier covered with Teflon tape (crystal 3) or titanium dioxide paint (crystals 1, 2 and 4). The scale employed for the light output measurements is expressed in arbitrary units. By comparison, on this scale the light output of a standard NaI (Tl) scintillator would be on the order of 200, and that for a standard GSO scintillator would be on the order of 40. The energy resolution was determined by using a standard cesium 137 gamma ray source. The energy resolution is expressed as the full width at half-maximum of the 662 KeV gamma ray peak. The scintillation decay time was exponential and had an average value of about 42 ns among the four crystals, as measured by the time-correlated, single photon technique.

Unexpectedly, the emission spectrum under gamma excitation was found to be different from the emission spectrum under ultraviolet excitation. The gamma emission spectrum peaked at approximately 426 nm—430 nm and was similar to the GSO emission spectrum. Also, both the gamma and ultraviolet-excited emissions exhibited a thermoluminescent effect with a half-life of about 10 minutes. The temperature response of the LSO crystals was not as good as GSO. The gamma-excited emission fell off at approximately 1.3% per degree C. Thus at 150°, the peak output is 20% of that at room temperature, which is similar to the temperature response of BGO. Accordingly, in those applications where high temperatures are anticipated, such as in certain oil well logging tools, the LSO scintillator may need to be isolated from the environment by a Dewar flask or other insulator.

Based on the data of Table 4 and previous experience with other single crystal scintillators and powder phosphors, it is expected that satisfactory LSO single crystal scintillators can be produced with cerium concentrations (in the melt from which the crystal is pulled) within the approximate range of from 0.1% to 10%, i.e., $0.001 \leq X \leq 0.1$. The preferred melt cerium concentration is within the range of from approximately 0.5% to 1.5%, i.e. $0.005 \leq X \leq 0.015$.

TABLE 5

|  | NaI(Tl) | BGO | GSO | LSO |  |
|---|---|---|---|---|---|
| Relative light output (20° C.) | 100 | 12 | 20 | 75 | - signal-to-noise |
| Energy resolution (best) | 6% | 9% | 8% | 9% | |
| Decay time (ns) | 230 | 300 | 60 | 41 | - counting rate |
| Effective atomic no. | 51 | 75 | 59 | 66 | |
|  |  |  |  |  | - detection eff. |
| Density (gm/cm$^3$) | 3.67 | 7.13 | 6.71 | 7.4 | |
| Index of refraction | 1.85 | 2.15 | 1.91 | 1.82 | |
| Hygroscopic? | yes | no | no | no | |
|  |  |  |  |  | - packaging |
| Mechanically rugged? | no | yes | no | yes | |
| Emission peak (nm at 20° C.) | 410 | 480 | 430 | 428 | |
| neutron cross section (barns) | 6.2 | 2.2 | 49,000 | 84 | |
| radiation length (cm) | 2.6 | 1.1 | 1.4 | 1.1 | |

Table 5 compares the principal physical and scintillation properties of the LSO single crystals with those for NaI(Tl), BGO, and GSO. With the NaI(Tl) crystal arbitrarily assigned a reference light output value of 100, it may be seen that the LSO crystal at 75 is markedly superior to the BGO and GSO crystals and only 25% below the NaI(Tl) value. The energy resolution of the LSO scintillator compares quite favorably with BGO and GSO and, again, was only slightly worse than NaI(Tl). The signal-to-noise performance of the LSO scintillator, therefore, is much improved relative to the BGO and GSO detectors. Although somewhat lower than NaI(Tl) in signal-to-noise ratio, LSO possesses other properties that are superior to NaI(Tl).

Thus the average decay time of 41 ns is shorter than any of the other three crystals and is some 5 to 6 times shorter than NaI(Tl). The LSO scintillator, therefore, is particularly useful in high counting rate detectors. LSO also has a very high gamma ray detection efficiency by virtue of its high effective atomic number and density. It is superior in this respect to both NaI(Tl) and GSO and is comparable to BGO. High detection efficiency further contributes to LSO's suitability for high counting rate applications.

Other favorable properties of LSO apparent from Table 5 include its low index of refraction, which results in less internal light loss than any of the other four scintillators. LSO is also non-hygroscopic, a particular advantage for oil well logging applications or other wet environments. Its mechanical ruggedness is superior to both NaI(Tl) and GSO, a feature which is also desirable for well logging and other uses where rough handling is encountered.

As already noted, the gamma emission peak is at approximately 428 nm, which is substantially the same as GSO and only slightly above NaI(Tl). A good match to the typical photomultiplier spectral response results. The neutron cross section is especially favorable in comparison to GSO, 84 barns vs. 49,000 barns. Hence the occurrence of interfering gamma rays due to neutron capture within the crystal is greatly reduced relative to GSO. Finally, the radiation length of LSO is as good as that of BGO and considerably shorter than either GSO or NaI, with consequent advantages in the crystal size required.

As may be appreciated from Tables 4 and 5, the LSO single crystal scintillator is comparable to or exceeds other known scintillators in nearly all properties important for use as a gamma ray detector, i.e., light output, energy resolution, efficiency of detection of high energy photons, scintillation decay time, hygroscopicity, susceptibility of crystal to mechanical damage, refractive index, emission spectrum match to photo-multiplier tube response, transparency of the crystal to its own scintillation emission, and absence of induced gamma radiation within the crystal. The only area in which LSO compares unfavorably is in the temperature sensitivity of the gamma-excited emission. In controlled environments, e.g. laboratories, hospitals, etc., this presents no problem. Even in high temperature environments, moreover, the unique combination of light output, speed, and detection efficiency found in LSO will in many instances justify the additional effort of isolating the scintillator from environmental temperature changes.

As discussed above, the LSO scintillator detector of the present invention is particularly effective as a radiation detector in a borehole logging environment, such as for petroleum exploration. In such use, the detector forms part of a logging system which may be of the type disclosed in the aforementioned copending U.S. application Ser. No. 149,953 and illustrated in FIG. 2 herein.

Figure 2:
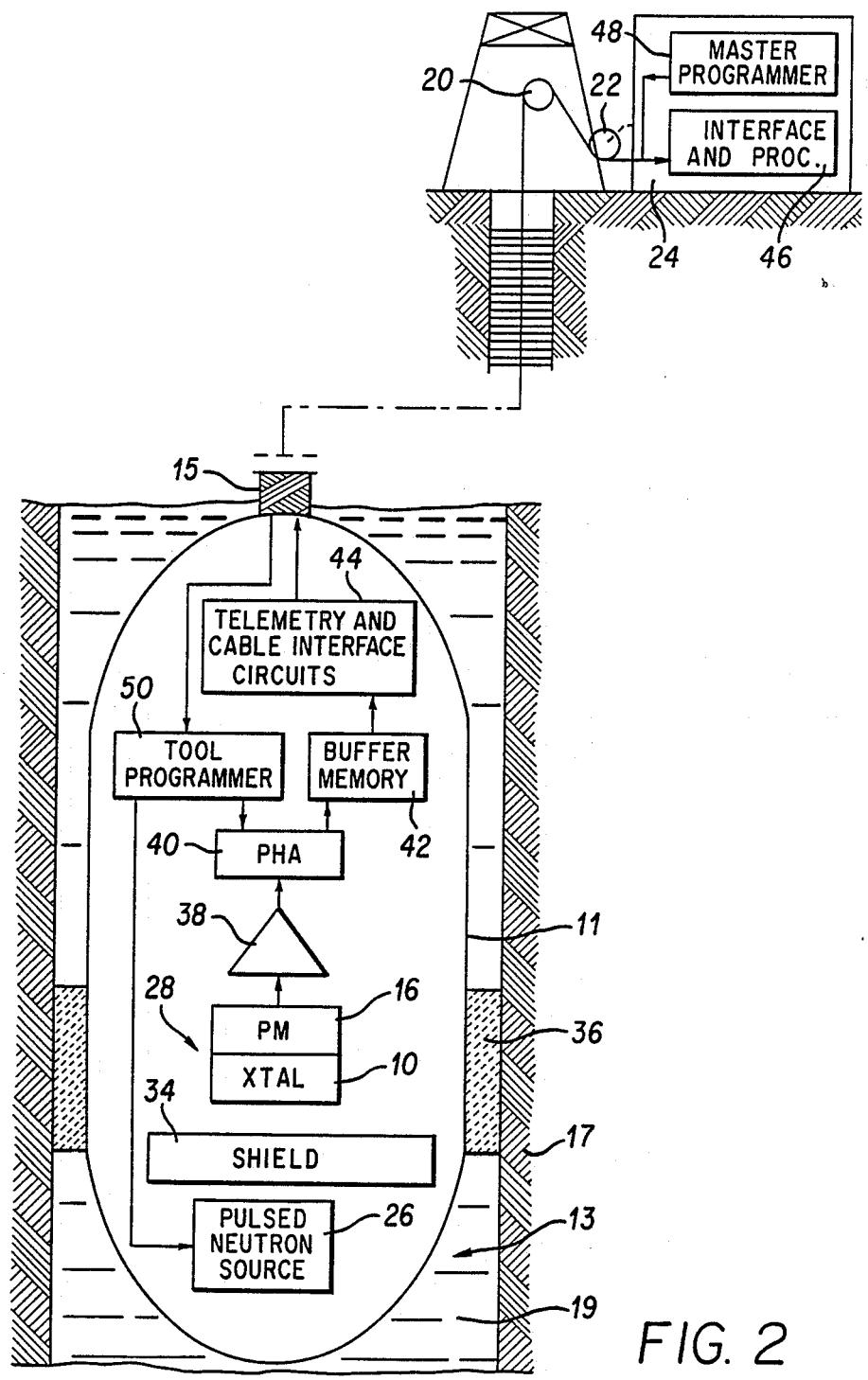
FIG. 2 is a schematic diagram of a borehole logging sonde in which the LSO scintillation detector of FIG. 1 may be used.

FIG. 2 shows a logging sonde 11 for sensing gamma radiation resulting from bombardment of a formation with high energy neutrons and detecting the energy of the radiation for subsequent spectral analysis. The sonde 11 is suspended in a borehole 13 on an armored multiconductor cable 15. The borehole 13 traverses a formation 17 and is filled with fluid 19, and may be open as shown or cased. The sonde 11 as described below may be constructed in accordance with U.S. Pat. No. 4,317,993 to Hertzog, Jr. et al, assigned to the assignee of the present application. The sonde 11 is moved in the borehole 13 by playing the cable 15 out and reeling it back in over a sheave wheel 20 and a depth gauge 22 by means of a winch forming part of a surface equipment 24. Usually the logging measurements are actually made while the sonde 11 is being raised back up the borehole 13, although in certain circumstances they may be made on the way down instead or as well.

The sonde 11 includes a pulsed neutron source 26 for producing primary radiation to bombard the formation 17 with fast neutrons as the sonde 11 travels up the borehole 13, and a radiation detector 28 for detecting secondary (gamma) radiation induced thereby in the borehole 13 and the formation 17. The neutron source 26 is preferably of the pulsed accelerator type described in U.S. Pat. Nos. 3,461,291 to Goodman and 3,546,512 to Frentrop, both commonly owned with this application. This type of source is particularly suited to the generation of discrete bursts of high energy or fast neutrons, e.g. at 14 MeV, with a controlled duration and repetition rate.

The detector 28 is of a type appropriate to the detection of gamma radiation and the production of an electrical signal corresponding to each detected gamma ray and having an amplitude representative of the energy of the gamma ray. To this end the detector 28 is as shown in FIG. 1, including a cerium-activated LSO scintillation crystal 10 optically coupled to a photomultiplier tube (PMT) 16. Suitable tubes are manufactured by EMR Photoelectric, Princeton, N.J.

Although not as important as in the case of a GSO scintillator, a neutron shield 34 may be located between the source 26 and the detector 28 to limit direct bombardment of the detector 28 by neutrons from the source 26, thereby avoiding saturation of the detector 28 by such direct irradiation. In addition, especially in the case of measurement of capture gamma radiation, the sonde 11 may be surrounded by a sleeve 36 impregnated with boron carbide and located in the general vicinity of the source 26 and the detector 28. This sleeve displaces borehole fluid in the region of the detector 28, and absorbs neutrons scattered by the formation towards the detector 28, without significantly attenuating gamma radiation emanating from the formation. The net effect is to reduce the possiblity of neutron interactions with the borehole contents and the material of the sonde 11 in proximity to the detector 28 and which would otherwise produce detectable gamma rays constituting an undesirable perturbation of the required gamma ray measurement.

Electrical power for the sonde 11 is supplied via the cable 15 from the surface equipment 24. The sonde 11 includes power conditioning circuitry (not shown) for feeding power at appropriate voltage and current levels to the source 26, the detector 28 and other downhole circuits. These circuits include an amplifier 38 and associated circuitry which receives the output pulses from the PMT 16. The amplifed pulses are then applied to a pulse height analyzer (PHA) 40 including an analog-to-digital converter which may be of any conventional type such as the single ramp (Wilkinson rundown) type. Other suitable analog to digital converters may be used for the gamma ray energy range to be analyzed. Linear gating circuits may also be employed for control of the time portion of the detector signal frame to be analyzed. Improved performance can be obtained by the use of additional conventional techniques such as pulse pile-up rejection.

The pulse height analyzer 40 assigns each detector pulse to one of a number (typically in the range 256 to 8000) of predetermined channels according to its amplitude (i.e. the gamma ray energy), and produces a signal in suitable digital form representing the channel or amplitude of each analyzed pulse. Typically the pulse height analyzer 40 includes memory in which the occurrences of each channel number in the digital signal are accumulated to provide an energy spectrum. The accumulated totals are then transferred via a buffer memory 42 (which can be omitted in certain circumstances) to telemetry and cable interface circuits 44 for transmission over the cable 15 to the surface equipment 24.

At the surface the cable signals are received by cable interface and signal processing circutis 46. It will be understood that the circuits 44 and 46 may be of any suitable known construction for encoding and decoding, multiplexing and demultiplexing, amplifying and otherwise processing the signals for transmission to and reception by the surface equipment 24. Appropriate circuits are described, for example, in U.S. Pat. No. 4,012,712 to Nelligan.

The operation of the sonde 11 is controlled by signals sent downhole from a master programmer 48, located in te surface equipment 24. These signals are received by a tool programmer 50 which transmits control signals to the neutron source 26 and the pulse height analyzer 40.

The surface equipment 24 includes various electronic circuits used to process the data received from the downhole equipment, analyze the energy spectrum of the detected gamma radiation, extract therefrom information about the formation 17 and any hydrocarbons that it may contain, and produce a tangible record or log of some or all of this data and information, for example on film, paper or tape. These circuits may comprise special purpose hardware or alternatively a general purpose computer appropriately programmed to perform the same tasks as such hardware. Details of such analysis form no part of this invention and will not be described here, but may be found for example in U.S. Pat. No. 3,521,064.

Although the invention has been described and illustrated by reference to representative embodiments thereof, it will be understood that such embodiments are susceptible of modification and variation without departing from the inventive concepts disclosed. All such modifications and variations, therefore, are intended to be included within the spirit and scope of the appended claims.

I claim:

1. A gamma ray or x-ray detector, comprising: a scintillator composed of a transparent single crystal of cerium-activated lutetium oxyorthosilicate having the general formulation $Ce_{2x}Lu_{2(1-x)}SiO_5$, where x is within the range of from approximately $2 \times 10^{-4}$ to approximately $3 \times 10^{-2}$, and a photodetector optically coupled to the scintillator for producing an electrical signal in response to the emission of a light pulse by the scintillator.

2. The detector of claim 1 wherein x is within the range of approximately $1 \times 10^{-3}$ to approximately $4.5 \times 10^{-3}$.

* * * * *

UNITED STATES PATENT AND TRADEMARK OFFICE
CERTIFICATE OF CORRECTION

PATENT NO.    : 4,958,080

DATED         : September 18, 1990

INVENTOR(S)   : Charles L. Melcher

It is certified that error appears in the above-identified patent and that said Letters Patent is hereby corrected as shown below:

Title page, item [63], AND col. 1, line 6, after "continuation" insert -- in part --;

Col. 1, line 6, delete "now abandoned":

Col. 1, line 7, after "1988" insert -- , now abandoned --.

Signed and Sealed this

Ninth Day of June, 1992

Attest:

DOUGLAS B. COMER

*Attesting Officer*     Acting Commissioner of Patents and Trademarks